United States Patent
Love et al.

(10) Patent No.: US 10,868,815 B2
(45) Date of Patent: *Dec. 15, 2020

(54) LEVERAGING FLEXIBLE DISTRIBUTED TOKENS IN AN ACCESS CONTROL SYSTEM

(71) Applicant: Schlage Lock Company LLC, Carmel, IN (US)

(72) Inventors: Devin A. Love, Westfield, IN (US); John Goodrich, Carmel, IN (US); Robert Martens, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,375

(22) Filed: Dec. 10, 2019

(65) Prior Publication Data
US 2020/0228532 A1 Jul. 16, 2020

Related U.S. Application Data

(63) Continuation of application No. 15/656,641, filed on Jul. 21, 2017, now Pat. No. 10,505,938.

(51) Int. Cl.
*H04L 29/06* (2006.01)
*H04L 9/32* (2006.01)
*G07C 9/00* (2020.01)

(52) U.S. Cl.
CPC ........ *H04L 63/101* (2013.01); *G07C 9/00309* (2013.01); *G07C 9/00571* (2013.01);
(Continued)

(58) Field of Classification Search
CPC . H04L 63/101; H04L 9/3213; G07C 9/00571; G07C 9/00309
(Continued)

(56) References Cited

U.S. PATENT DOCUMENTS 6,553,029 B1 * 4/2003 Alexander ............ H04L 49/351
370/389
7,738,454 B1 * 6/2010 Panwar ................ H04L 45/745
370/389

(Continued)

OTHER PUBLICATIONS

International Search Report; International Searching Authority; International Patent Application No. PCT/US2018/043277; dated Oct. 25, 2018; 2 pages.

(Continued)

*Primary Examiner* — Tae K Kim
*Assistant Examiner* — Peiliang Pan
(74) *Attorney, Agent, or Firm* — Taft Stettinius & Hollister LLP

(57) ABSTRACT

A method according to one embodiment includes determining whether a guest associated with a guest device is authorized to control an access control device based on an access control list, generating a caveated cryptographic bearer token in response to determining the guest is authorized to control the access control device, the caveated cryptographic bearer token including a time-based caveat defining a time limit for control of the access control device, transmitting the caveated cryptographic bearer token to the guest device in response to generating the caveated cryptographic bearer token, transmitting, in response to receiving the caveated cryptographic bearer token, a request including the caveated cryptographic bearer token to control the access control device to the access control device, and authenticating the request based on the received caveated cryptographic bearer token, a base cryptographic bearer token stored on the access control device, and a real-time clock of the access control device.

20 Claims, 5 Drawing Sheets

(52) U.S. Cl.
CPC .......... *H04L 9/3213* (2013.01); *H04L 9/3226* (2013.01); *H04L 63/102* (2013.01); *G07C 2009/00841* (2013.01)

(58) Field of Classification Search
USPC .......................................................... 713/168
See application file for complete search history.

(56) References Cited

U.S. PATENT DOCUMENTS

| | | | |
|---|---|---|---|
| 9,160,744 B1* | 10/2015 | Machani | H04L 9/0863 |
| 9,589,129 B2 | 3/2017 | Richardson et al. | |
| 9,640,002 B1* | 5/2017 | Grosberg | G07C 9/00571 |
| 10,333,705 B2* | 6/2019 | Smith | H04L 63/06 |
| 2003/0121968 A1 | 7/2003 | Miller et al. | |
| 2008/0229056 A1* | 9/2008 | Agarwal | G06F 16/9014 |
| | | | 711/216 |
| 2010/0123002 A1 | 5/2010 | Caporicci | |
| 2011/0286584 A1 | 11/2011 | Angel et al. | |
| 2013/0214902 A1 | 8/2013 | Pineau et al. | |
| 2014/0068247 A1 | 3/2014 | Davis et al. | |
| 2014/0195812 A1* | 7/2014 | Emelko | H04L 9/08 |
| | | | 713/178 |
| 2015/0067792 A1 | 3/2015 | Benoit et al. | |
| 2015/0100503 A1 | 4/2015 | Lobo et al. | |
| 2015/0288513 A1* | 10/2015 | Nelson | H04N 21/835 |
| | | | 380/44 |
| 2016/0019735 A1 | 1/2016 | Myers et al. | |
| 2016/0098198 A1* | 4/2016 | Bosshart | G06F 3/064 |
| | | | 711/154 |
| 2016/0234186 A1 | 8/2016 | LeBlond et al. | |
| 2016/0373417 A1* | 12/2016 | Mandal | H04L 9/0844 |
| 2017/0053467 A1 | 2/2017 | Meganck et al. | |
| 2017/0220792 A1* | 8/2017 | Rea | G06F 21/31 |
| 2017/0220793 A1* | 8/2017 | Birgisson | H04L 63/101 |
| 2017/0223005 A1* | 8/2017 | Birgisson | H04L 63/0807 |
| 2017/0251025 A1 | 8/2017 | Varley et al. | |
| 2017/0302641 A1 | 10/2017 | Ramatchandirane et al. | |

OTHER PUBLICATIONS

Written Opinion; International Searching Authority; International Patent Application No. PCT/US2018/043277; dated Oct. 25, 2018; 7 pages.

Birgisson et al., Macaroon: Cookies with Contextual Caveats for Decentralized Authorization in the Cloud, NDSS 14, Feb. 23-26, 2014, pp. 1-16, Internet Society, San Diego, California.

Lopez-Alt, Cryptographic Security of Macaroon Authorization Credentials, Dec. 6, 2013, pp. 1-25.

\* cited by examiner

LEVERAGING FLEXIBLE DISTRIBUTED TOKENS IN AN ACCESS CONTROL SYSTEM

CROSS-REFERENCE TO RELATED APPLICATIONS

The present application is a continuation of U.S. patent application Ser. No. 15/656,641 filed Jul. 21, 2017 and issued as U.S. Pat. No. 10,505,938, the contents of which are hereby incorporated by reference in their entirety.

BACKGROUND

Access control systems typically involve the use of credentials to manage the operation of an access control device (e.g., a lock device). Such credentials may be assigned to a particular user or device and are often physical in nature forming at least a portion of, for example, a smartcard, proximity card, key fob, token device, or mobile device. Additionally, an access control database that identifies which credentials (e.g., which user devices) are permitted control over the access control device (e.g., lock/unlock functions) is typically stored on the access control device or a server in communication with the access control device. As such, an update to the access control database to change the credentials associated with the access control device, if even possible, often involves an update (or even a factory reset) of the access control device itself.

SUMMARY

According to one aspect, a method includes determining, by a server, whether a guest associated with a guest device is authorized to control an access control device based on an access control list stored on the server; generating, by the server, a caveated cryptographic bearer token in response to a determination that the guest is authorized to control the access control device, wherein the caveated cryptographic bearer token includes a time-based caveat that defines a tune limit for control of the access control device; transmitting, by the server, the caveated cryptographic bearer token to the guest device in response to generation of the caveated cryptographic bearer token; transmitting, by the guest device and in response to receipt of the caveated cryptographic bearer token from the server, a request to control the access control device to the access control device, wherein the request includes the caveated cryptographic bearer token; and authenticating, by the access control device, the request based on the received caveated cryptographic hearer token, a base cryptographic bearer token stored on the access control device, and a real-time clock of the access control device.

In some embodiments, the method may further include requesting, by the guest device, the caveated cryptographic bearer token from the server. Further, determining whether the guest is authorized to control the access central device may include determining whether the guest is authorized to control the access control device in response to receipt of the request for the caveated cryptographic bearer token by the server. In some embodiments, authenticating the request ma include determining whether the caveated cryptographic bearer token was derived from the base cryptographic bearer token, and comparing the time caveat to the real-time clock of the access control device to determine whether a current time is within the time limit.

In some embodiments, the caveated cryptographic bearer token may be or may include a macaroon. Further some embodiments, generating the caveated cryptographic bearer token may include generating the caveated cryptographic bearer token based on the base cryptographic bearer token. In some embodiments, the method may further include transmitting, by the guest device, a command to control a function of the access control device in response to successful authentication of the request by the access control device; and performing, by the access control device, the function based on the command.

In some embodiments, the access control list identifies one or more access control devices and guest access control permissions for each of the one or more access control devices, and the access control list is modifiable by an owner device authenticated via a separate security domain. In some embodiments, the method may further include verifying, by the server, an identifier of an owner associated with the owner device via the separate security domain; determining, the server, a guest access control permission for one of the one or more access control devices to revoke; and updating, by the server, the access control list to revoke the guest access control permission. Further, revocation of the guest access control permission may prevent the server from subsequently issuing a caveated cryptographic bearer token to a corresponding guest device to control a corresponding access control device.

In some embodiments, the method may further include verifying, by the server, an identifier of an owner associated with the owner device via the separate security domain; transmitting, by the server and to a target guest device associated with a target guest, an invitation to control the access control device; verifying, by the server, a guest identifier of the target guest via the separate security domain; and updating, by the server, the access control list to indicate that the target guest is authorized to have time-limited and permission-limited control the access control device in response to successful verification of the guest identifier.

In some embodiments, the method may further include registering an owner of the access control device with the server via the separate security domain; providing a programming code of the access control device to the owner device, transmitting the base cryptographic bearer token generated by the access control device from the owner device to the server; and updating the access control list to identify ownership of the access control device by the owner. Further, the base cryptographic bearer token stored on the access control device may be the base cryptographic bearer token generated by the access control device and transmitted to the server. In some embodiments, the programming code is, identified on at least one of a component of the access control device or paperwork provided with the access control device upon purchase of the access control device. In some embodiments, the access control device is a lock device, the server is a cloud-based server, and the guest device is a mobile device. In some embodiments, the guest device is a user interface that permits a guest user to interact with the server and the access control device.

According to another aspect, an access control system may include it server, a guest device, and a lock device. Further, the server may include a first processor and a first memory comprising a first plurality of instructions stored thereon that, in response to execution by the first processor, causes the server to determine whether a guest associated with a guest device is authorized to control a lock device based on an access control list stored on the server, generate a caveated cryptographic bearer token in response to a determination that the guest is authorized to control the lock device, wherein the caveated cryptographic bearer token includes a time-based caveat that defines a time limit for control of the lock device, and transmit the caveated cryptographic bearer token to the guest device in response to generation of the caveated cryptographic bearer token. The guest device may include a second processor and a second memory comprising a second plurality of instructions stored thereon that, in response to execution by the second processor, causes the guest device to receive the caveated cryptographic bearer token from the server and transmit a request to control the lock device to the lock device in response in response to receipt of the caveated cryptographic bearer token, wherein the request includes the caveated cryptographic bearer token. The lock device may include a lock mechanism to control access to a passageway, a third processor, and a third memory comprising a third plurality of instructions stored thereon that, in response to execution by the third processor, causes the lock device to authenticate the request based on the received caveated cryptographic bearer token, a base cryptographic bearer token stored on the lock device, and a real-time clock of the lock device.

In some embodiments, to authenticate the request may include to determine whether the caveated cryptographic hearer token was derived from the base cryptographic bearer token and to compare the time caveat to the real-time clock of the look device to determine whether a current time is within the time limit. Further, in some embodiments, the caveated cryptographic bearer token may be or may include a macaroon, the access control list may identify one or more lock devices and guest access control permissions for each of the one or more lock devices, and the access control list may be modifiable by an owner device authenticated via a separate security domain. In some embodiments, the caveated cryptographic bearer token is generated based on the base cryptographic be token. Further, in some embodiments, the second plurality of instructions may further cause the guest device to transmit a command to unlock the lock mechanism of the lock device in response to successful authentication of the request by the lock device, and the third plurality of instructions may further cause the lock device to unlock the lock mechanism in response to the command.

According to yet another aspect, an access control system may include at least one processing device and at least one memory including a plurality of instructions stored thereon that, in response to execution by the at least one processing device, causes the access control system to request, by a guest device, a derived macaroon from a cloud system, wherein the derived macaroon includes a time-based caveat that restricts control of the access control device beyond a defined time; determine, by the cloud system, whether the guest is authorized to control the access control device based on an access control list stored on the cloud system; generate, by the cloud system, the derived macaroon in response to a determination that the guest is authorized to control the access control device; transmit, by the cloud system, the derived macaroon to the guest device in response to generation of the derived macaroon; transmit, by the guest device and in response to receipt of the derived macaroon from the cloud system, a request to control the access control device to the access control device, wherein the request includes the derived macaroon; and authenticate, by the access control device, the request based on the received derived, macaroon, a base macaroon stored on the access control device, and a real-time clock of the access control device.

In some embodiments, to authenticate the request may include to determine whether the derived macaroon was derived from the base macaroon, and to compare the time-based caveat to the reel-time clock of the access control device to determine whether a current time is within the time limit. In some embodiments, the derived macaroon may further include at least one of a permission-based caveat or a location based caveat. In some embodiments, the cloud system may be configured to execute a plurality of virtual functions.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
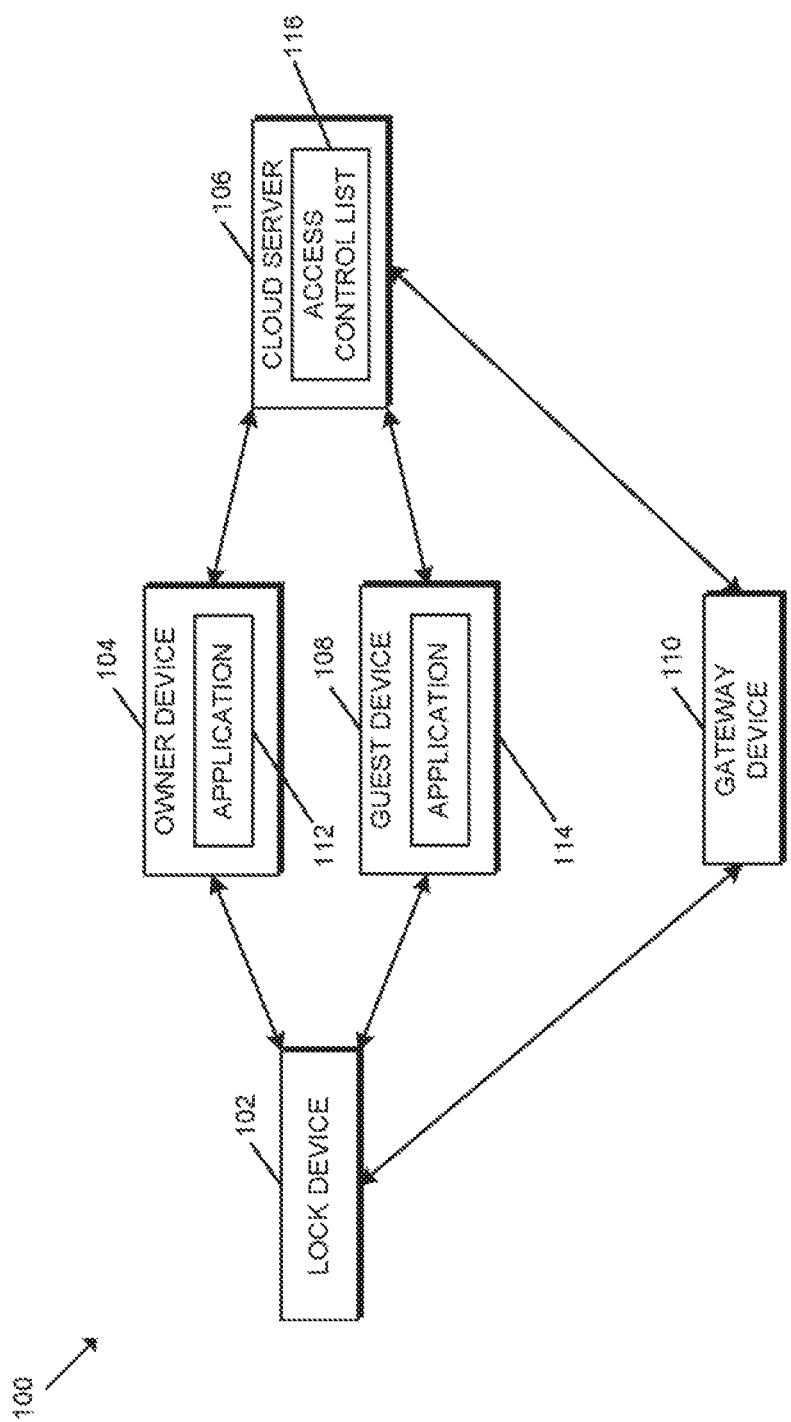
FIG. 1 is a simplified block diagram of at least one embodiment of an access control system for leveraging flexible distributed tokens.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment" etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different planner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, the illustrative embodiment, an access control system 100 for leveraging flexible distributed tokens includes a lock device 102, an owner device 104, a cloud server 106, and a guest device 108. Additionally, m some embodiments, the access control system 100 may also include a gateway device 110.

As described in detail below, the access control system 100 allows for flexible access control over offline lock devices 102 and/or other access control devices. For example, some embodiments, the owner of a lock device 102 may invite others (guests) to gain entry to a facility without having a connection to the facility's locks and/or readers. To do so, the access control system 100 may utilize connectivity to a cloud server 106 that distributes caveated cryptographic bearer tokens (e.g., macaroons) to the owner device 104 and/or guest devices 108 for use with a specified lock device 102. It should be further appreciated that the lock device 102 of the access control system 100 is not limited, for example, in the number of guests that can control the lock device 102 and/or other limitations associated with finite onboard memory, because the lock device 102 is not required to locally store an access control list of authorized users. Instead, as described herein, the lock device 102 may store a base macaroon (or other base cryptographic token), which may be compared (e.g., directly or indirectly) to derived macaroons or contextual cryptographic bearer tokens to determine whether a particular user/device should be granted access/control.

In the illustrative embodiment, the access control system 100 leverages the flexibility associated with contextual cryptographic bearer tokens (e.g., macaroons) for access control. For example, as described below, the lock device 102 and the owner device 104 may communicate with one another during a setup or registration process in which a base cryptographic bearer token (e.g., a base macaroon) with a base set of restrictions is generated (e.g., a valid after date/time, a particular security model, etc.). Once generated and submitted to the cloud server 106, the cloud server 106 may append additional caveats to the base cryptographic bearer token and its restrictions, for example, to reduce the duration the token is valid or limit the permissions given to a particular user/guest. In particular, in doing so, the cloud server 106 may employ a cryptographic hash function (e.g., an HMAC) to hash the additional caveats to the base cryptographic bearer token to generate a derived or caveated cryptographic bearer token (e.g., a derived macaroon). It should be appreciated that, in the illustrative embodiment, the additional caveats may only modify the base token to be more restrictive than the base token, which prevents a guest, for example, from obtaining greater privileges than the owner of the lock device 102.

As shown in FIG. 1, the illustrative owner device 104 includes an application 112 that enables the lock owner to register an account with the cloud server 106 or cloud service associated therewith. In the illustrative embodiment, it should be appreciated that the owner's secure login (e.g., username and password) to the cloud server/service constitutes a separate security domain from the security domain associated with the flexible tokens described herein. The application 112 further provides a user interface by which the owner may enter user input associated with registering a particular lock device 102 to the owner. Additionally, in some embodiments, after the base cryptographic bearer token (e.g., base macaroon) is generated and stored to the lock device 102 and the cloud server 106, the token may be removed, from the owner device 104. In such embodiments, the owner may subsequently use the application 112 to retrieve a caveated bearer token to access/control the lock device 102 in a manner similar to that described below in reference to a guest.

The guest device 108 similarly includes an application 114 that enables a particular guest to register an account with the cloud server/service, request and/or receive an invitation from the owner to access/control a particular lock device 102, request and/or receive caveated cryptographic bearer tokens (e.g., macaroons) for access/control of particular lock devices 102, and interact with the lock devices 102.

The applications 112, 114 may be embodied as any suitable applications for performing the functions described herein. For example, in some embodiments, the owner device 104 and the guest device 108 are embodied as mobile devices. In such embodiments, the applications 112, 114 may be embodied as mobile applications smartphone applications). In some embodiments, it should be appreciated that one or more of the applications 112, 114 may serve as a client-side user interface for a web based application or service of the cloud server 106.

As shown in FIG. 1, the cloud server 106 includes an access control list 116, in the illustrative embodiment, the access control list 116 identifies each lock device 102 registered to the cloud server/service, the ownership of each of those lock devices 102, and the guests (if any) permitted access to each of those lock devices 102. In some embodiments, each user (e.g., owner/guest) may be associated with a universally unique identifier (UUID) generated during the secure login with the cloud server 106 (e.g., generated as a JWT token). In such embodiments, it should be appreciated that the owner and guests of a particular lock device 102 may be identified in the access control list 116 by the corresponding UUID of that owner or guest. Each lock device 102 may be similarly identified based on a lock programming/security code and/or a unique lock identifier. For example, in some embodiments, each lock device 102 may be identified based on a lock programming code visually identified on a component of the lock device 102 (e.g., the back of the lock device 102), included on paperwork provided with the lock device 102 upon purchase of the lock device 102, and/or stored in a memory of the lock device 102 and securely transferable.

In some embodiments, the access control list 116 may identify a memory location of the cloud server 106 from which the base cryptographic bearer token (e.g., base macaroon) corresponding with each of the registered lock devices 102 can be retrieved. In distributed environments, the access control list 116 may further identify, for example, the IP address and/or physical address of the device storing the token. It should be appreciated that the access control list 116 may be embodied as a table (e.g., an association table), a database, or any other data structure or collection of data structures suitable for performing the functions described herein.

As described in detail below, in the illustrative embodiment, the owner device 104 and the guest device 108 are embodied as mobile devices, and the lock device 102 may communicate with the owner device 104 and the guest device 108 over any suitable wireless communication connection (e.g., Bluetooth, Wi-Fi, etc.) established between the lock device 102 and the device 104, 108. Additionally, in the illustrative embodiment, the owner device 104 and the guest device 108 may communicate with the cloud server 106 using any suitable wireless communication connection. For example, in various embodiments, the owner device 104 and/or the guest device 108 may communicate with the cloud server 106 over Wi-Fi, WiMAX, a WAN (e.g., the Internet), and/or a suitable telecommunications network/protocol. As such, it should be appreciated that the illustrative cloud server 106 is located at one or more remote locations relative to the devices 102, 104, 108. In other embodiments, h should be appreciated that one or more of the communication connections may be wired.

In some embodiments, the access control system 100 may include the gateway device 110. For example, in some embodiments, the gateway device 110 may be used in conjunction with third-party integrations with the access control system 100. In some embodiments, a registered gateway device 110 may be treated as an additional owner of the lock device 102 with privileges similar to the owner. As such, unlike guests, the gateway device 110 may receive a cryptographic bearer token that is not time-limited and/or permission-limited in some embodiments. In embodiments that include the gateway device 110, it should be appreciated that the gateway device 110 may communicate with other devices of the access control system 100 over any suitable wired or wireless communication network and associated protocol.

Further, in some embodiments, one or more of the owner devices 104 and/or guest devices 108 may be embodied as a shared device or user interface device that permits a user to interact with the cloud server 106, the lock device 102, and/or cloud-based solutions. For example, one or more of the devices 104, 108, 110 may be embodied as a home assistant device or smart home hub. In some embodiments, the access control system 100 may include an ambient voice interface or other shared user interface instead of a user-owned graphical user interface. Further, in some embodiments, the access control system 100 may be accessed by virtue of a cloud-to-cloud integration with a third party integrator.

It should be appreciated that each of the lock device 102, the owner device 104, the cloud server 106, the guest device 108, and/or the gateway device 110 may be embodied as a computing device similar to the computing device 200 described below in reference to FIG. 2. For example, in the illustrative embodiment, each of the lock device 102, the owner device 104, the cloud server 106, the guest device 108, and the gateway device 110 includes a processing device 202 and a memory 206 having stored thereon operating logic 208 for execution by the processing device 202 for operation of the corresponding device. Additionally, although the lock device 102 is described herein for clarity of the description as a "lock device," it should be appreciated that, in other embodiments, the lock device 102 may be embodied as any access control device suitable for performing the functions described herein. As such, the description of the lock device 102 is equally applicable to embodiments of the access control system 100 having a different type of access control device.

It should be further appreciated that, although the cloud server 106 is described herein as a cloud-based device or collection of devices, in other embodiments, the cloud server 106 may be embodied as one or more devices outside of a cloud computing environment. Further, in some embodiments, the cloud server 106 may be embodied as a "serverless" or server-ambiguous computing solution, for example, that executes a plurality of instructions on-demand, contains logic to execute instructions only when prompted by a particular activity/trigger, and does not consume computing resources when not in use. That is, the cloud server 106 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the cloud server 106 described herein. For example, when an event occurs (e.g., a user presses a button in an application to unlock the lock device 102), the application may contact the virtual computing environment (e.g., via an HTTPS request to an API of the virtual computing environment), whereby the API may route the request to the correct virtual function (e.g., a particular server-ambiguous computing resource) based on a set of rules. As such, when a request for a caveated cryptographic bearer token is made, the appropriate virtual function(s) may be executed to determine if that user should receive access to the lock device 102, mint the appropriate caveated cryptographic bearer token, and transmit that information back to the user before eliminating the instance of the virtual function(s).

Although only one lock device 102, one owner device 104, one cloud server 106, one guest device 108, and one gateway device 110 are shown in the illustrative embodiment of FIG. 1, the access control system 100 may include multiple lock devices 102, owner devices 104, cloud servers 106, guest devices 108, and/or gateway devices 110 in other embodiments. For example, as described herein, a particular owner may have multiple owner devices 104 that the owner may use to securely connect with the cloud server 106 (e.g., via secure login over a security domain separate from the cryptographic bearer tokens) in order to register a lock device 102 and/or invite/revoke access control permissions of a particular guest for the lock device 102. Similarly, a guest with permission to access/control a particular lock device 102 may securely connect with the cloud server 106 via any suitable guest device 108 to request and receive a caveated cryptographic bearer token for access to the lock device 102. Further, in some embodiments, a particular owner and/or guest may have access to multiple lock devices 102. As such, it should be appreciated that, in some embodiments, a particular user may be an owner of one lock device 102 and a guest with respect to another lock device 102. Similarly, a particular device may be an owner device 104 or a guest device 108 depending on the particular person (and login credentials thereof) using the device. In some embodiments, it should be appreciated that the cloud server 106 may be embodied as multiple servers in a cloud computing environment. Accordingly, in such embodiments, the access control list 116 and/or other data used by the access control system 100 may be distributed among multiple servers.

Figure 2:
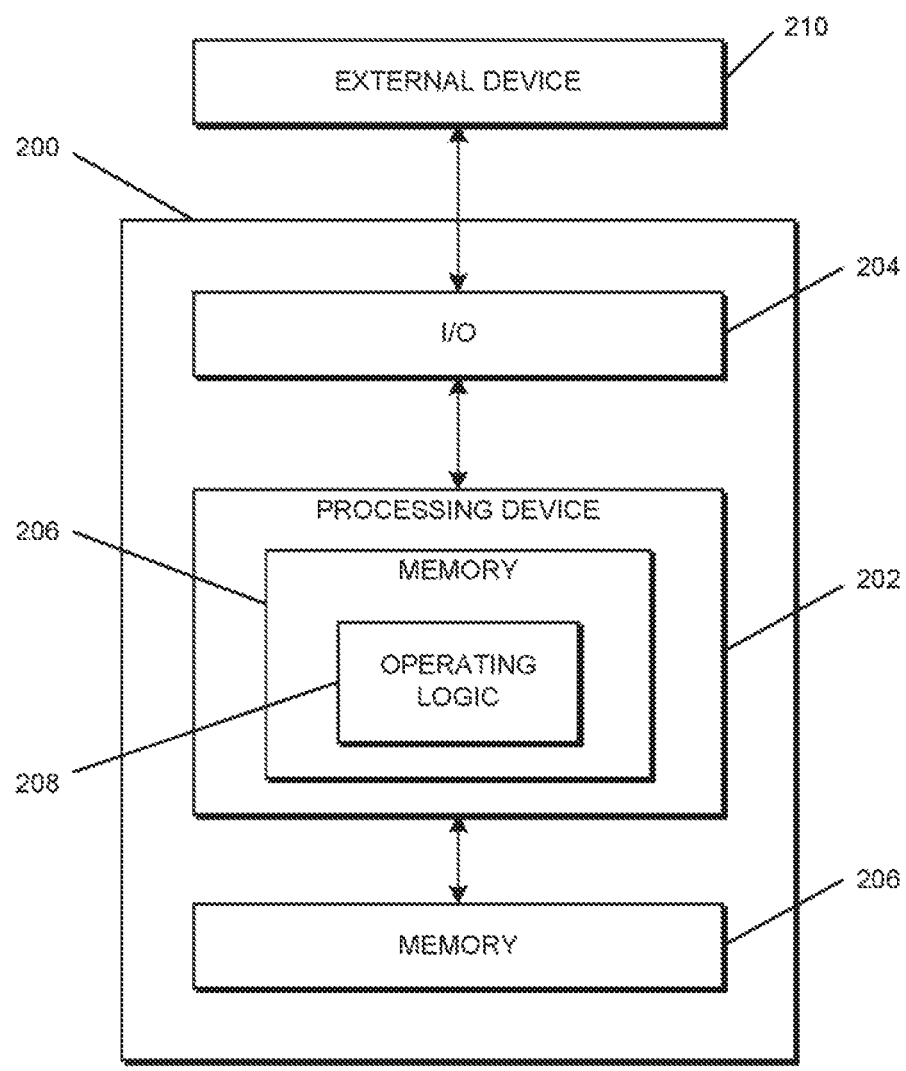
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a lock device, owner device, cloud server, guest device, and/or gateway device that may be utilized in connection with the lock device 102, the owner device 104, the cloud server 106, the guest device 108, and/or the gateway device 110 illustrated in FIG. 1. Depending on the particular embodiment, computing device 200 may be embodied as a reader device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the lock device 102, the owner device 104, the cloud server 106, the guest device 108, and/or the gateway device 110. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein, in particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipe lined, and/or parallel processing in various embodiments. Further, the processing device 202 may be dedicated to performance of just the operations described herein, or may be utilized in one or more additional applications, in the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

In some embodiments, the illustrative lock device 102 includes a lock mechanism that is configured to control access through a passageway. For example, in some embodiments, the lock mechanism may be configured to be positioned in a locked state in which access to the passageway is denied, or may be positioned in an unlocked state in which access to the passageway is permitted, in some embodiments, the lock mechanism includes a deadbolt, latch bolt, lever, and/or other mechanism adapted to move between the locked and unlocked slate and otherwise perform the functions described herein. However, it should be appreciated that the lock mechanism may be embodied as any another mechanism suitable for controlling access through a passageway in other embodiments.

Figure 3:
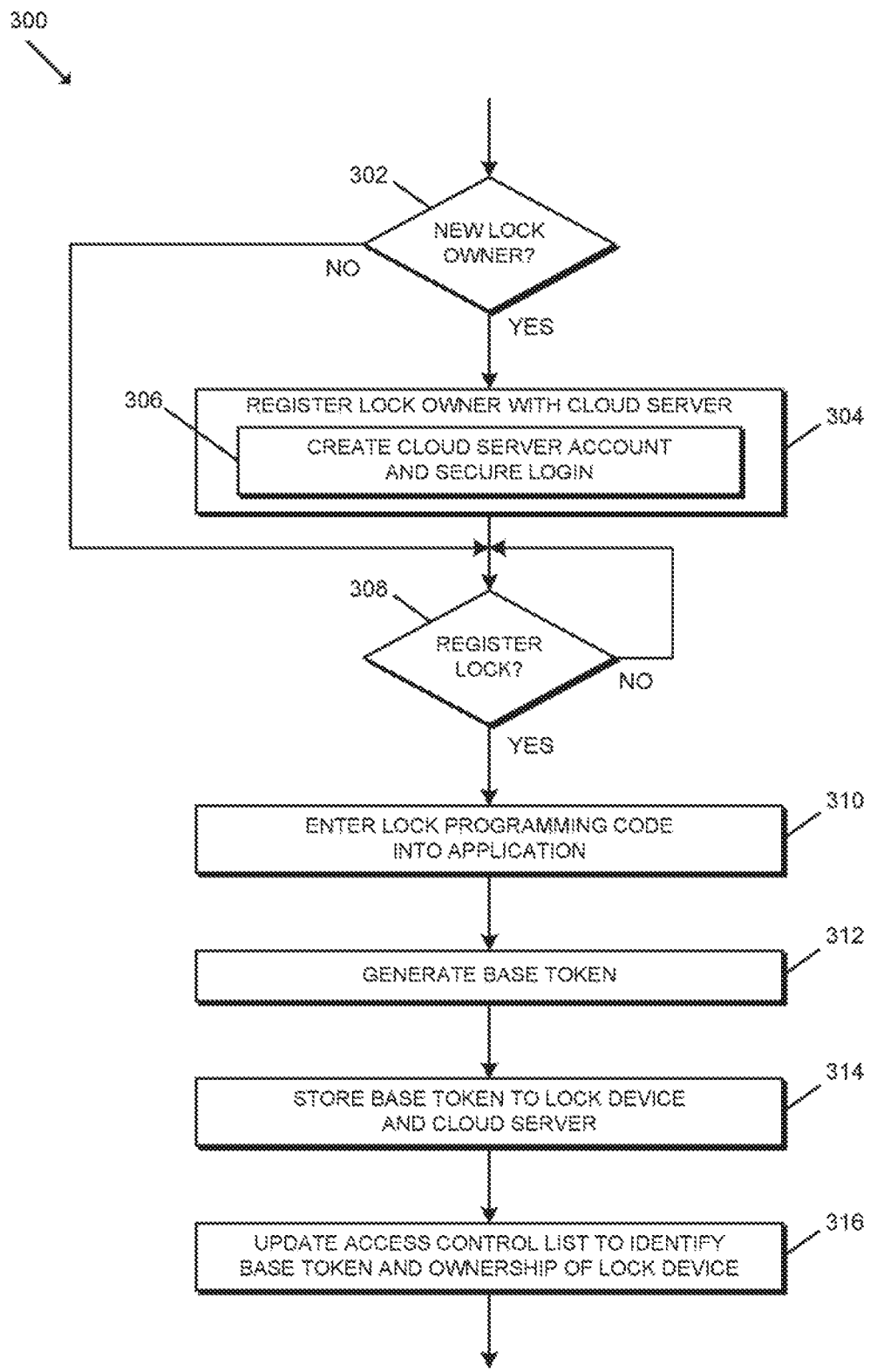
FIG. 3 is a simplified block diagram of at least one embodiment of a method for registering a lock device.

Referring now to FIG. 3, in use, the access control system 100 may execute a method 300 for registering a lock device 102. It should be appreciated that the particular blocks of the method 300 are illustrated by way of example, and such blocks may be combined or divided, added or removed, and/or reordered in whole or in part depending on the particular embodiment, unless stated to the contrary. The illustrative method 300 begins with block 302 in which a lock owner establishes a communication connection with the cloud server 106 via an owner device 104, and the cloud server 106 determines whether the lock owner is a new lock owner or a registered lock owner. It should be appreciated that the cloud server 106 may employ any suitable technique to do so. For example, in some embodiments, a user interface presented on the owner device 104 may ask the user whether the user is a registered lock owner (e.g., whether the user has an existing cloud server account) and, if so, prompt the user/owner for secure login information to the cloud server account. In such circumstances, the method 300 advances to block 308.

However, if the cloud server 106 determines that the user/owner is a new lock owner (e.g., a lock owner without an existing cloud server account), the method 300 advances to block 304 in which the lock owner is registered with the cloud server 106. In particular, in block 306, the owner may create a cloud server account and secure login to the cloud server 106 or associated cloud service. As described above, in the illustrative embodiment, it should be appreciated that the secure login is associated with a security domain different from the cryptographic bearer tokens. For example, as described above, each user (e.g., owner/guest) may be associated with a UUID generated during the secure login with the cloud server 106 (e.g., generated as a JWT token) for identification of the user by the cloud server 106. In some embodiments, the UUID may be based in part on the username and/or primary phone number of the user. It should be appreciated that, in some embodiments, the secure login may require multi factor authentication.

In block 308, the cloud server 106 determines whether to register a particular lock device 102 to the owner. If so, the method 300 advances to block 310 in which the owner enters a lock programming code into the application 112 of the owner device 104. As indicated above, in some embodiments, each lock device 102 may be identified, for example, based on a lock programming code visually identified on a component of the lock device 102 (e.g., the back of the lock device 102) or included on paperwork provided with the lock device 102 upon purchase of the lock device 102. As such, the owner may copy the programming code into the application 112 of the owner device 104. Additionally, in some embodiments, it should be appreciated that the programming code may be programmed into the memory of the lock device 102. In such embodiments, the programming code may be securely transmitted to the owner device 104, for example, for comparison to programming code manually entered by the owner into the application 112.

It should be appreciated that the lock programming code may serve as proof to the lock device 102 and the application 112 that the owner has possession of and/or is authorized to setup/register the lock device 102. In some embodiments, entry of the lock programming code initiates a session to establish a secure pairing between the lock device 102 and the owner device 104 (or the application 112, in particular). For example, in some embodiments, the lock device 102 and the owner device 104 may perform a secure password authenticated key exchange (SPAKE) based on the lock programming code (e.g., in which the lock programming code serves as a SPAKE2 password), which may include the generation of one or more base cryptographic bearer tokens (e.g., macaroons) as described below. In particular, in some embodiments, the lock device 102 may mint a client authentication token and a server authentication token, which may be included in or form a portion of one or more base cryptographic bearer tokens. The server authentication token may be subsequently used to ensure that a device is actually communicating with the appropriate lock device 102 and the lock device 102, for example, is not being "spoofed" by a nefarious actor. The client authentication token may be used for secure access to the lock device 102 and, for simplicity, may be referred to herein simply as the cryptographic bearer token (despite some embodiments of the bearer tokens including both the server authentication token and the client authentication token).

As indicated above, in block 312, a base cryptographic bearer token (e.g., a base macaroon) is generated by the lock device 102, for example, as part of a secure pairing between the lock device 102 and the owner device 104 (or the application 112, in particular). As described above, in the illustrative embodiment, the base cryptographic bearer token is generated by the lock device 102 and securely transmitted to the owner device 104 (e.g., encrypted by a SPAKE key). However, in other embodiments, it should be appreciated that the token may alternatively be generated by the owner device 104 and transmitted to the lock device 102. In block 314, the base cryptographic bearer token is stored to the lock device 102 and the cloud server 106. For example, in the illustrative embodiment, the owner device 104 securely transmits the base cryptographic bearer token to the cloud server 106 (e.g., via the application 112) and the deletes the token from the memory of the owner device 104. In block 316, the access control list 116 of the cloud server 106 is updated to identify the base cryptographic bearer token and ownership of the lock device 102 by the registered owner. For example, as indicated above, in some embodiments, the access control list 116 may be updated to identify a memory location of the cloud server 106 from which the base cryptographic bearer token can be retrieved. Additionally, the access control list 116 may be updated to associate the owner with the lock device 102 (e.g., by mapping the owner's UUID to a lock identifier of the lock device 102).

Although the blocks 302-316 are described in a relatively serial manner, it should be appreciated that various blocks of the method 300 may be performed in parallel in some embodiments.

Figure 4:
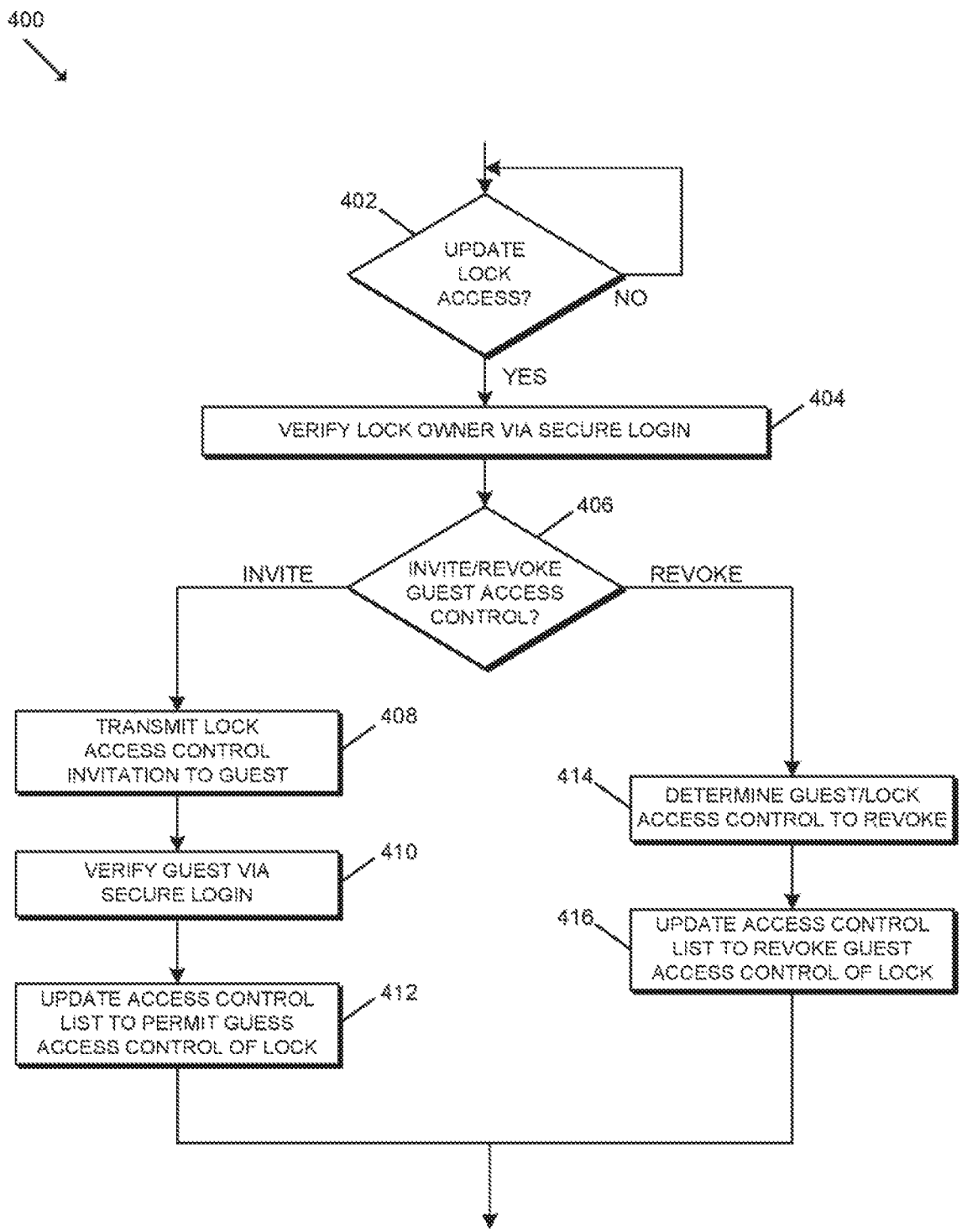
FIG. 4 is a simplified block diagram of at least one embodiment of a method for updating: an access control list.

Referring now to FIG. 4, in use, the access control system 100 may execute a method 400 for updating an access control list 116. It should be appreciated that the particular blocks of the method 400 are illustrated by way of example, and such blocks may be combined or divided, added or removed, and/or reordered in whole or in part depending on the particular embodiment, unless stated to the contrary. The illustrative method 400 begins with block 402 in which the access control system 100 determines whether an owner desires to update access control permissions for a particular lock device 102. For example, in some embodiments, an owner may indicate a desire to update the lock permissions via an application 112 executing on an owner device 104 (e.g., by selecting a particular option on the application, by initiating a secure login, etc.). In block 404, the cloud server 106 verifies the lock owner via secure login in a manner similar to that described above (e.g., via username/password over a separate security domain from the cryptographic bearer tokens). As indicated above, in some embodiments, the lock owner may be required to securely login using multi factor authentication and, therefore, may be required to, for example, enter a security code received via text message or email, provide biometric input, and/or otherwise provide proof of identity.

Assuming the lock owner has been verified, in block 406, the cloud server 106 determines (e.g., based on a user selection in the application 112 of the owner device 104) whether the owner desires to invite a guest to have access control of the lock device 102 or revoke a particular guest's access control permissions for a particular lock device 102.

If the owner is inviting a guest to have access control over a particular lock device 102 (e.g., based on user input), in block 408, the cloud server 106 transmits an invitation to a guest device 108 associated with the guest. It should be appreciated that the owner may identify the guest and/or guest device 108 using any suitable identifier. For example, in some embodiments, the owner may provide the guest's phone number and/or email address to which the cloud server 106 may address the invitation (e.g., via voice, SMS, or email). Upon receiving the invitation, in block 410, the guest may securely login to the cloud server 106 or associated cloud service as described above. In particular, in some embodiments, upon selecting a link, provided in the invitation, the guest may be prompted to securely login to the cloud server 106 or create a new account. In block 412, the cloud server 106 updates the access control list 116 to permit the guest to have access control of the lock device 102. As described above, in the illustrative embodiment, guests are provided time-limited and permission-limited access control relative to the owner, which may have full access control over the lock device 102 that is not time-bounded (or time-bounded with a greater time limit). Having updated the access control list 116 to permit the guest access to the lock device 102, the cloud server 106 may subsequently issue temporary tokens (e.g., caveated cryptographic bearer tokens) to be given to the guest for access to the lock device 102 as described herein. In some embodiments, it should be appreciated that the temporary token may provide schedule-based access to the guest. For example, the token may include a modified and/or additional time-based caveat that sets a time at which the token becomes valid, thereby providing a window within which the temporary token may be used (e.g., between the time at which it becomes valid and the time at which it expires).

Returning to block 406, if the owner is revoking a guest's access control permissions for a particular lock device 102, in block 414, the cloud server 106 determines (e.g., based on user input of the owner) the particular lock device 102 registered to the owner (if multiple lock devices 102 are registered to the owner for which access controls are to be modified, and the particular guest that currently has access control permissions to that lock device 102 to be revoked. In other words, in some embodiments, the cloud server 106 determines the guest/lock combination for which to revoke access. In other embodiments, it should be appreciated that the cloud server 106 may revoke a particular guest's access to all lock devices 102 of the owner and/or revoke access of all guests to a particular lock device 102. In block 416, the cloud server 106 updates the access control list 116 to revoke the guest's access control of the particular lock device 102. For example, in some embodiments, the cloud server 106 deletes the guest from an entry associated with the lock device 102 or otherwise disassociates the guest with the lock device 102. However, it should be appreciated that the cloud server 106 may update the access control list 116 to reflect the revocation using any suitable technique, which may vary depending on the particular embodiment (e.g., depending on the particular data structure of the access control list 116). It should be appreciated that, in the illustrative embodiment, revocation of the guest access control permission prevents the cloud server 106 from subsequently issuing/transmitting a caveated cryptographic hearer token to a guest device 108 of the guest (unless currently associated with a different authorized guest as described above) to access the lock device 102.

In some embodiments, the cloud server 106 may update the access control list 116 to grant and, or revoke multiple access control permissions concurrently depending on the user input of the owner. In some embodiments, the access control list 116 may also include a blacklist that defines one or more devices that are unauthorized to receive a cryptographic bearer token under any circumstances. Further, it should be appreciated that the techniques described herein allow the owner to update the access control list 116 that defines access controls for the lock device 102 without interacting with the lock device 102 for which access controls are being modified.

Although the blocks 402-416 are described in a relatively serial manner, it should be appreciated that various blocks of the method 400 may be performed in parallel in some embodiments.

Figure 5:
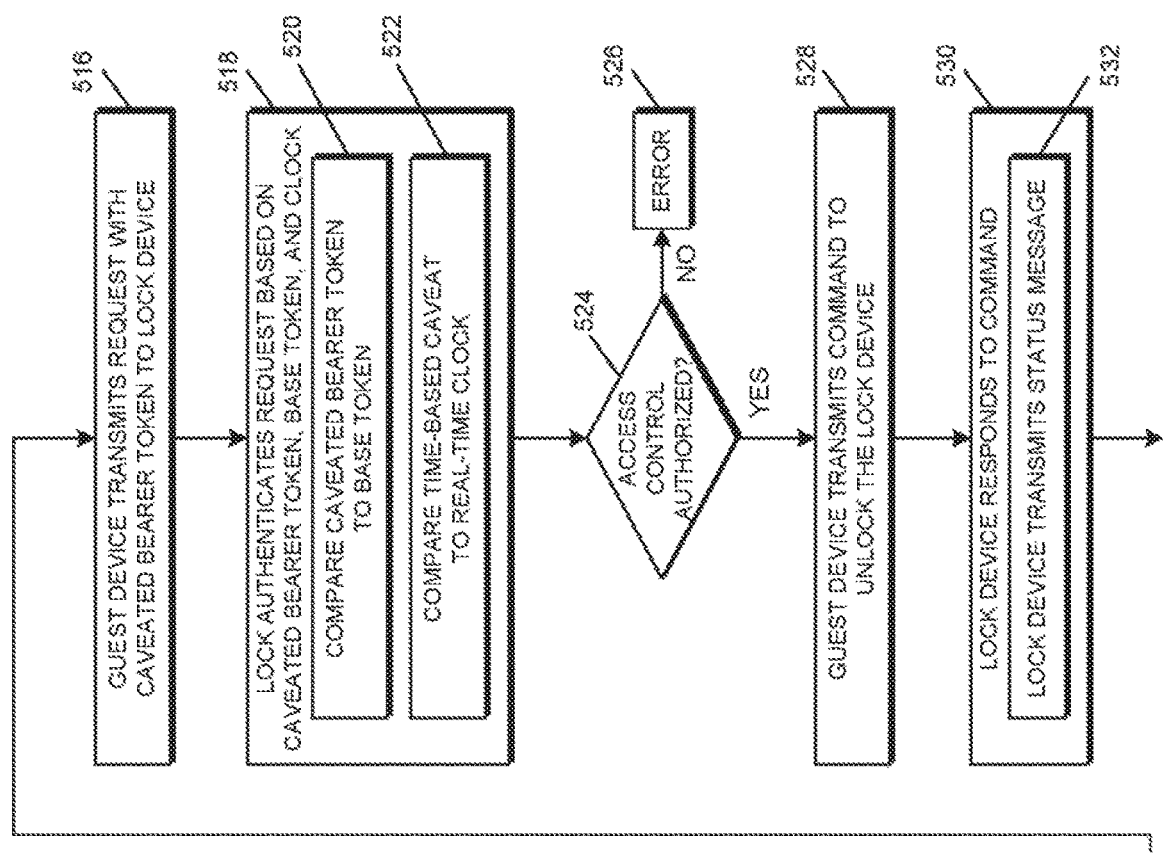
FIG. 5 is a simplified block diagram of at leapt one embodiment of a method for controlling a lock device by a guest device.
Figure 5:
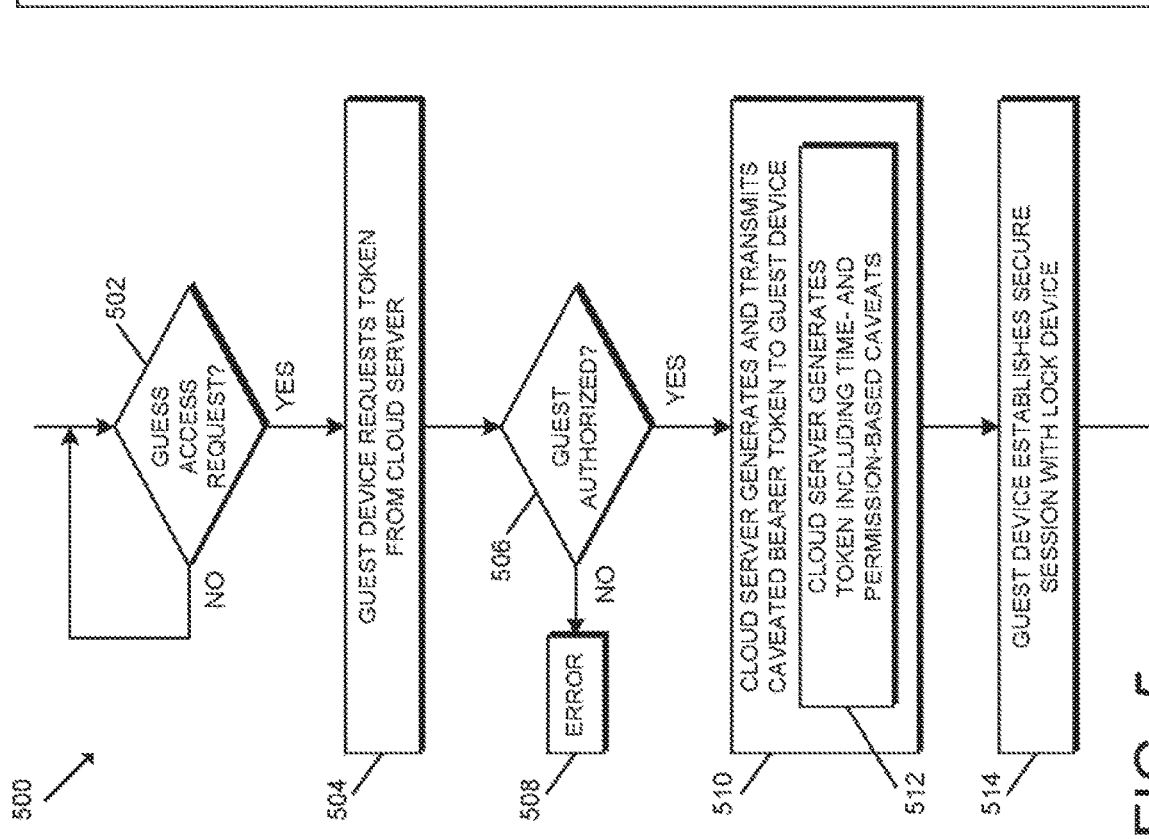

Referring, now to FIG. 5, in use, the access control system 100 may execute a method 500 for controlling a lock device 102 by a guest device 108. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 begins with block 502 in which the cloud server 106 determines whether a guest is requesting access control over a particular lock device 102. For example, in some embodiments, the guest may request access control over the lock device 102 via the application 114 on the guest device 108. In particular, in some embodiments, the application 114 may include a graphical user interface that identifies each of the lock devices 102 for which the guest has access control permissions. In some embodiments, the application 114 may identify those lock devices 102 for which the guest has ownership and, therefore, has owner-level access control permissions in addition to the lock devices 102 for Which the guest has guest-level access permissions. Depending on the particular embodiment, the application 114 may or may not graphically distinguish the lock devices 102 that have owner-level permissions from those having guest-level permissions.

Upon identifying the particular lock device 102 for which access control is desired, in block 504, the guest device 108 requests a caveated cryptographic bearer token from the cloud server 106. In block 506, the cloud server 106 determines whether the guest using the guest device 108 is authorized to control the lock device 102 based on the access control list 116 stored in the cloud server 106. For example, as described above, the guest may be required to securely login to the cloud server 106 or associated cloud service through a security domain separate from the token-based security in order to prove the guests identity. Further, in the illustrative embodiment, the cloud server 106 compares the guest's identity (e.g., the guest generated during the secure login) to the access control list 116 to confirm that the guest identifier is associated with the lock device 102 that the guest desires to access/control. If the guest's identity cannot be verified by secure login and/or the guest identifier is not associated with control of the lock device 102 in the access control list 116, the access control system 100 performs one or more error handling procedures in block 508. For example, in some embodiments, the cloud server 106 drops its communication connection with the guest device 108, alerts the owner of the error, and/or records the error in an audit file. Further, the application 114 may alert the user of the guest device 108 of the error. It should be appreciated, however, that the access control system 100 may, additionally or alternatively, perform other suitable error handling procedures.

Returning to block 506, if the cloud server 106 determines that the guest is authorized, to control the lock device 102, the method 500 advances to block 510 in which the cloud server 106 generates a caveated cryptographic bearer token and transmits the generated token to the guest device 108. In particular, in block 512, the cloud server 106 may generate a caveated cryptographic bearer token including a time-based caveat that defines a time limit for control of the lock device 102 and a permission-based caveat that defines a permission level of the bearer of the token as described herein. In particular, in the illustrative embodiment, the cloud server 106 retrieves the base cryptographic bearer token associated with the lock device 102 (see block 316 of FIG. 3) and generates a caveated cryptographic bearer token based on that base cryptographic bearer token. In other embodiments, the cloud server 106 may, additionally or alternatively, include other caveats. For example, in some embodiments, the generated caveated cryptographic bearer token may include a location-based caveat that defines a physical location, region, boundary, and or radius within which the token is valid (e.g., for mobile lock devices 102 such as bicycle locks).

As described above, it should be appreciated that the cryptographic bearer tokens described herein may include or be embodied as macaroons. It should be appreciated that a macaroon is a data structure that can have caveats appended to it, for example, to limit time access and privilege level of a user of a lock device 102. When the lock device 102 is paired with the owner device 104 (e.g., during a one-time action unless a factory default reset occurs to reset data on die lock device 102), the lock device 102 may generate a macaroon that is transmitted to the owner device 104 and forwarded to the cloud server 106 (see blocks 314, 316 of FIG. 3). The macaroon may be composed of a security key and caveats associated with a macaroon type (e.g., owner, admin/manager, and user/guest) and a timestamp indicating a creation time of the macaroon. Further, in some embodiments, the macaroon may include a caveat associated with a function of the macaroon (e.g., what the macaroon is intended to do). The security key may be based, for example, on the SPAKE key generated during the pairing between the lock device 102 and the owner device 104. In other embodiments, another suitable key may be used for the macaroon. The permitted values for the time-based caveat may vary depending on the particular embodiment. For example, in some embodiments, the time-based caveat may allow time/expiration limits of one hour, twenty-four hours, thirty days, or absolute/non-expiring. In other embodiments, any suitable time limits may be used. It should be appreciated that, in the illustrative embodiment, the time limits define the amount of time that may elapse from the generation of the macaroon (e.g., defined by a timestamp in the macaroon) before the macaroon is considered to be expired.

In some embodiments, the base macaroon, base, may be generated according to base={base_caveats|base_tag}, where base_caveats is a concatenated string of the caveats of the base macaroon, base_tag=HMAC(key,base_caveats), and HMAC is a keyed-hash message authentication code of the base_caveats using key as the cryptographic key for the hash. As indicated above, it should be appreciated that any suitable keys may be used for the generation of the base macaroon. Further, as described herein, a macaroon may also be derived from the base macaroon (e.g., for transmittal to a guest device 108) thereby narrowing the permissions of the base macaroon (e.g., further including time-limiting and/or permission-limiting caveats). In particular, a derived macaroon, guest, may be generated according to guest=HMAC(base_tag, guest_caveats)=HMAC(HMAC (key,base_caveats),guest_caveats), where guest_caveats is a concatenated string of the additional caveats defining the guest's access control permissions. It should be further appreciated that the macaroons may further incorporate caveats associated with a particular session and/or other suitable information.

Referring back to FIG. 5, in block 514, the guest device 108 establishes a secure communication session with the lock device 102 and, in block 516, the guest device 108 securely transmits a request to control the lock device 102 including the caveated cryptographic bearer token to the lock device 102. In block 518, the lock device 102 authenticates the access control request based on the received caveated cryptographic bearer token, the base cryptographic bearer token stored on the lock device 102 (see block 316 of FIG. 3), and the real-time clock of the lock device 102. In particular, in block 520, the lock device 102 compares the caveated cryptographic bearer token to the base cryptographic bearer token to determine whether the caveated cryptographic bearer token is associated with the base cryptographic bearer token. It should be appreciated that the tokens may be compared directly or indirectly depending on the particular embodiment. For example, in the illustrative embodiment, the lock device 102 determines whether caveated cryptographic bearer token was derived from the base cryptographic bearer token using a suitable technique or algorithm (e.g., using the appropriate keys and the HMAC as described above). Additionally, in block 522, the lock device 102 compares the time-based caveat to the real-time clock of the lock device 102 to determine whether the current time is within the time limit defined by the time-based caveat.

If the caveated cryptographic bearer token is not properly associated with the base cryptographic bearer token or the current time is outside the time period for control authorized by the time-based caveat, for example, the authentication fails and the guest device 108 is determined to be unauthorized to control the lock device 102. If the lock device 102 determines, in block 524, that the access control is unauthorized, the access control system 100 performs one or more error handling procedures in block 526. For example, the access control system 100 may handle the error in, a manner similar to that described above in reference to block 508. In particular, the lock device 102 may drop its communication connection with the guest device 108 and/or record the error in an audit file that may be subsequently retrieved (e.g., by an owner device 104). Further, the application 114 may alert the user of the guest device 108 of the error. It should be appreciated, however, that the access control system 100 may, additionally or alternatively, perform other suitable error handling procedures.

It should be further appreciated that, in some embodiments, the access control system 100 may perform an error handling procedure if a guest token is presented and the real-time clock of the lock device 102 has not been set (e.g., due to a power reset). To do so, in some embodiments, the access control system 100 may perform one or more of the techniques described in reference to U.S. patent application Ser. No. 15/656,678 filed on Jul. 21, 2017, the entirety of which is incorporated herein by reference.

However, if the access control is authorized, the method 500 advances to block 528 in which the guest device 108 may transmit a command to control a function of the lock device 102. In particular, in some embodiments, the guest device 108 may transmit a command to the lock device 102 to unlock a lock mechanism of the lock device 102. In other embodiments, however, the guest device 108 may transmit a command to perform any suitable function depending on the type of access control device being controlled. In block 530, the lock device 102 responds to the command. For example, the lock device 102 may perform the requested function in response to receiving the command to do so (e.g., unlock a lock mechanism). Further, in block 532, in some embodiments, the lock device 102 may transmit a status message to the guest device 108 based on the success or failure of the requested function. For example, in the illustrative embodiment, if the guest has delayed issuing a command such that the time limit defined by the time-based caveat is no longer satisfied, the access control attempt will be denied by the lock device 102.

It should be appreciated that the owner may utilize an owner device 104 to retrieve an owner-level contextual cryptographic bearer token for access to a lock device 102 of the owner in a manner similar to that described above in reference to a guest obtaining a token. However, in some embodiments, the owner's token generated by the cloud server 106 does not include a time-based caveat or may be less time-bounded than the guest's token. In other embodiments, the owner may retrieve and use the base cryptographic bearer token for access to the lock device 102. In the illustrative embodiment, however, the owner device 104 does not perpetually store the base cryptographic bearer token as doing so could pose a security risk to the system.

Although the blocks 502-532 are described in a relatively serial manner, it should be appreciated that various blocks of the method 500 may be performed in parallel in some embodiments.

What is claimed is:

1. A method, comprising:
   deriving, by a server, a caveated cryptographic bearer token from a base cryptographic bearer token; and
   transmitting, by the server, the caveated cryptographic bearer token to a guest device of a guest authorized to control an access control device in response to deriving the caveated cryptographic bearer token;
   wherein the base cryptographic bearer token includes a base set of caveats and a first keyed cryptographic hash of the base set of caveats;
   wherein the caveated cryptographic bearer token includes a guest set of caveats including a time-based caveat that defines a time limit for control of the access control device and a second keyed cryptographic hash based on the first keyed cryptographic hash and the guest set of caveats; and
   wherein the first keyed cryptographic hash is a key for the second keyed cryptographic hash.

2. The method of claim 1, further comprising:
   receiving, by the access control device and from the guest device, a request to control the access control device, wherein the request includes the caveated cryptographic bearer token; and
   authenticating, by the access control device, the request based on the received caveated cryptographic bearer token, a base cryptographic bearer token stored on the access control device, and a real-time clock of the access control device.

3. The method of claim 2, wherein authenticating the request comprises:
   determining whether the caveated cryptographic bearer token was derived from the base cryptographic bearer token; and
   comparing the time-based caveat to the real-time clock of the access control device to determine whether a current time is within the time limit.

4. The method of claim 2, further comprising:
   receiving, by the access control device and from the guest device, a command to control a function of the access control device; and
   performing, by the access control device in response to successful authentication of the request by the access control device, the function based on the command.

5. The method of claim 4, wherein performing the function comprises at least one of unlocking or locking a lock mechanism associated with the access control device.

6. The method of claim 1, wherein the first keyed cryptographic hash is keyed based on a security key generated during a pairing between the access control device and an owner device.

7. The method of claim 6, wherein the security key comprises a secure password authentication key exchange (SPAKE) key generated during a secure password authentication key exchange between the access control device and the owner device.

8. The method of claim 1, wherein the first keyed cryptographic hash is a first keyed-hash message authentication code (HMAC) and the second keyed cryptographic hash is a second HMAC.

9. The method of claim 1, wherein deriving the caveated cryptographic bearer token comprises deriving the caveated cryptographic bearer token in response to a determination that the guest is authorized to control the access control device based on an access control list stored on the server that identifies one or more access control devices and guest access control permissions for each of the one or more access control devices; and wherein the access control list is modifiable by an owner device authenticated via a separate security domain.

10. The method of claim 9, further comprising:

verifying, by the server, an identifier of an owner associated with the owner device via the separate security domain;

determining, by the server, a guest access control permission for one of the one or more access control devices to revoke; and updating, by the server, the access control list to revoke the guest access control permission;

wherein revocation of the guest access control permission prevents the server from subsequently issuing a caveated cryptographic bearer token to a corresponding guest device to control a corresponding access control device.

11. The method of claim 9, further comprising:

verifying, by the server, an identifier of an owner associated with the owner device via the separate security domain;

transmitting, by the server and to a target guest device associated with a target guest, an invitation to control the access control device;

verifying, by the server, a guest identifier of the target guest via the separate security domain; and updating, by the server, the access control list to indicate that the target guest is authorized to have time-limited and permission-limited control the access control device in response to successful verification of the guest identifier.

12. An access control system, comprising:

a server including one or more first processors and one or more first memories comprising a first plurality of instructions stored thereon that, in response to execution by the one or more first processors, causes the server to (i) derive a caveated cryptographic bearer token from a base cryptographic bearer token and (ii) transmit the caveated cryptographic bearer token to a guest device of a guest authorized to control an access control device in response to deriving the caveated cryptographic bearer token;

wherein the base cryptographic bearer token includes a base set of caveats and a first keyed cryptographic hash of the base set of caveats;

wherein the caveated cryptographic bearer token includes a guest set of caveats including a time-based caveat that defines a time limit for control of the access control device and a second keyed cryptographic hash based on the first keyed cryptographic hash and the guest set of caveats; and wherein the first keyed cryptographic hash is a key for the second keyed cryptographic hash.

13. The access control system of claim 12, wherein the first keyed cryptographic hash is keyed based on a security key generated during a pairing between the access control device and an owner device.

14. The access control system of claim 12, further comprising the access control device;

wherein the access control device includes one or more second processors and one or more second memories comprising a second plurality of instructions stored thereon that, in response to execution by the one or more second processors, causes the access control device to (i) receive a request from the guest device to control the access control device, wherein the request includes the caveated cryptographic bearer token, and (ii) authenticate the request based on the received caveated cryptographic bearer token, a base cryptographic bearer token stored on the access control device, and a real-time clock of the access control device.

15. The access control system of claim 14, wherein to authenticate the request comprises to (i) determine whether the caveated cryptographic bearer token was derived from the base cryptographic bearer token and (ii) compare the time-based caveat to the real-time clock of the access control device to determine whether a current time is within the time limit.

16. An access control system, comprising:

at least one processor; and at least one memory comprising a plurality of instructions stored thereon that, in response to execution by the at least one processor, causes the access control system to (i) derive a caveated cryptographic bearer token from a base cryptographic bearer token and (ii) transmit the caveated cryptographic bearer token to a guest device of a guest authorized to control an access control device in response to deriving the caveated cryptographic bearer token;

wherein the base cryptographic bearer token includes a base set of caveats and a first keyed cryptographic hash of the base set of caveats;

wherein the caveated cryptographic bearer token includes a guest set of caveats including a time-based caveat that defines a time limit for control of the access control device and a second keyed cryptographic hash based on the first keyed cryptographic hash and the guest set of caveats; and wherein the first keyed cryptographic hash is a key for the second keyed cryptographic hash.

17. The access control system of claim 16, wherein the first keyed cryptographic hash is keyed based on a security key generated during a pairing between the access control device and an owner device.

18. The access control system of claim 16, wherein to derive the caveated cryptographic bearer token comprises to derive the caveated cryptographic bearer token in response to a determination that the guest is authorized to control the access control device based on an access control list accessible to the access control system that identifies one or more access control devices and guest access control permissions for each of the one or more access control devices; and wherein the access control list is modifiable by an owner device authenticated via a separate security domain.

19. The access control system of claim 18, wherein the plurality of instructions further causes the access control system to (i) verify an identifier of an owner associated with the owner device via the separate security domain, (ii) determine a guest access control permission for one of the one or more access control devices to revoke, and (iii) update the access control list to revoke the guest access control permission;

wherein revocation of the guest access control permission prevents the access control system from subsequently issuing a caveated cryptographic bearer token to a corresponding guest device to control a corresponding access control device.

20. The access control system of claim 18, wherein the plurality of instructions further causes the access control system to (i) verify an identifier of an owner associated with the owner device via the separate security domain, (ii) transmit, an invitation to control the access control device to a target guest device associated with a target guest, (iii) verify a guest identifier of the target guest via the separate security domain, and (iv) update the access control list to indicate that the target guest is authorized to have time-limited and permission-limited control the access control device in response to successful verification of the guest identifier.

* * * * *